United States Patent
Sella et al.

(10) Patent No.: US 9,459,957 B2
(45) Date of Patent: Oct. 4, 2016

(54) OFFLOADING NODE CPU IN DISTRIBUTED REDUNDANT STORAGE SYSTEMS

(71) Applicant: MELLANOX TECHNOLOGIES LTD., Yokneam (IL)

(72) Inventors: Omer Sella, Timrat (IL); Ofer Hayut, Kvutzat Yavne (IL); Yaron Haviv, Tel Mond (IL); Liron Mula, Ramat Gan (IL); Noam Bloch, Bat Shlomo (IL); Nir Getter, Haifa (IL); Ariel Shachar, Jerusalem (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 447 days.

(21) Appl. No.: 13/925,868

(22) Filed: Jun. 25, 2013

(65) Prior Publication Data

US 2014/0379836 A1    Dec. 25, 2014

(51) Int. Cl.
*G06F 15/173* (2006.01)
*G06F 11/10* (2006.01)
*H04L 29/08* (2006.01)

(52) U.S. Cl.
CPC .... *G06F 11/1076* (2013.01); *G06F 2211/1028* (2013.01); *H04L 67/1097* (2013.01)

(58) Field of Classification Search
CPC .................................................. H04L 67/1097

USPC .................................................. 709/212, 213
See application file for complete search history.

(56) References Cited

U.S. PATENT DOCUMENTS

| | | | |
|---|---|---|---|
| 8,219,887 B2 | 7/2012 | Pruthi | |
| 8,290,919 B1 * | 10/2012 | Kelly et al. | 707/698 |
| 2006/0026328 A1 | 2/2006 | Li | |
| 2006/0143506 A1 | 6/2006 | Whitt et al. | |
| 2009/0094380 A1 * | 4/2009 | Qiu | G06F 21/80 709/239 |
| 2013/0246568 A1 * | 9/2013 | Chesterfield | H04L 67/1097 709/217 |

OTHER PUBLICATIONS

Huang et al., "Erasure Coding in Windows Azure Storage", Proceedings of 2012 USENIX Annual Technical conference, 12 pages, Boston, Jun. 13-15, 2012.

* cited by examiner

*Primary Examiner* — Adnan Mirza
(74) *Attorney, Agent, or Firm* — D.Kligler IP Services Ltd.

(57) ABSTRACT

A network interface includes a host interface for communicating with a node, and circuitry which is configured to communicate with one or more other nodes over a communication network so as to carry out, jointly with one or more other nodes, a redundant storage operation that includes a redundancy calculation, including performing the redundancy calculation on behalf of the node.

21 Claims, 3 Drawing Sheets

OFFLOADING NODE CPU IN DISTRIBUTED REDUNDANT STORAGE SYSTEMS

FIELD OF THE INVENTION

The present invention relates generally to distributed storage, and particularly to methods and systems for CPU offloading in network nodes.

BACKGROUND OF THE INVENTION

Distributed data storage systems typically comprise multiple network nodes that store data and redundancy information used for data protection and recovery. For example, Redundant Array of Independent Disks (RAID) storage technology distributes data across multiple physical disk drive components. Various RAID schemes define multiple architecture levels to tradeoff redundancy versus performance.

U.S. Pat. No. 8,219,887, whose disclosure is incorporated herein by reference, describes a system and a method for parallel Reed-Solomon (RS) RAID data storage. The parallel RS-RAID data storage architecture can aggregate that data and checksums within each cluster into intermediate or partial sums that are transferred or distributed to other clusters.

U.S. Patent Application Publication 2006/0026328, whose disclosure is incorporated herein by reference, describes apparatus and related method for calculating parity of redundant array of disks. For error tolerance in a redundant array disks (RAID), a parity data is calculated according to plurality of data respectively accessed in disks of the RAID. A hardware calculation module for parity calculation can be implemented in a RAID controller. With direct memory access (DMA) capability of the RAID controller, the calculation module performs parity calculation by directly accessing a system memory for the plurality of data and the parity data. Thus, memory resources of the parity calculation can be supported by the system memory, and a central processing unit (CPU) can be offloaded during parity calculation.

U.S. Patent Application Publication 2006/0143506, whose disclosure is incorporated herein by reference, describes an integrated circuit and associated methods operable therein to provide hardware assist to RAID storage management controllers. The RAID assist integrated circuit offloads a general purpose processor of the storage controller from the responsibility and processing associated with address mapping.

SUMMARY OF THE INVENTION

An embodiment of the present invention that is described herein provides a network interface that includes a host interface for communicating with a node, and circuitry. The circuitry is configured to communicate with one or more other nodes over a communication network so as to carry out, jointly with one or more other nodes, a redundant storage operation that includes a redundancy calculation, including performing the redundancy calculation on behalf of the node.

In some embodiments, the circuitry is configured to calculate redundancy information over two or more data blocks. In other embodiments, by performing the redundancy calculation, the circuitry is configured to recover a block based on one or more other blocks. In yet other embodiments, following updating of a data block, the circuitry is configured to calculate an updated version of respective redundancy information depending on a previous version and an updated version of the data block.

In an embodiment, the circuitry is configured to receive a delta block that is indicative of a difference between the updated and previous versions of the data block, and to calculate the updated version of the redundancy information based on the delta block. In another embodiment, the circuitry is configured to calculate partial redundancy information, and to send the partial information to another node for calculation of redundancy information. In yet another embodiment, the circuitry is configured to receive from another node partial redundancy information that was calculated based on one or more data blocks, and to calculate redundancy information based on the partial redundancy information.

There is additionally provided, in accordance with an embodiment of the present invention, a method including, in a network interface of a node, communicating with one or more other nodes over a communication network. A redundant storage operation that includes a redundancy calculation is carried out jointly with the other nodes using circuitry in the network interface, including performing the redundancy calculation on behalf of the node.

There is additionally provided, in accordance with an embodiment of the present invention, a network node including a CPU and a network interface. The network interface is configured to communicate with one or more other nodes over a communication network so as to carry out, jointly with one or more other nodes, a redundant storage operation that includes a redundancy calculation, including performing the redundancy calculation on behalf of the CPU.

The present invention will be more fully understood from the following detailed description of the embodiments thereof, taken together with the drawings in which:

DETAILED DESCRIPTION OF EMBODIMENTS

Overview

Figure 1:
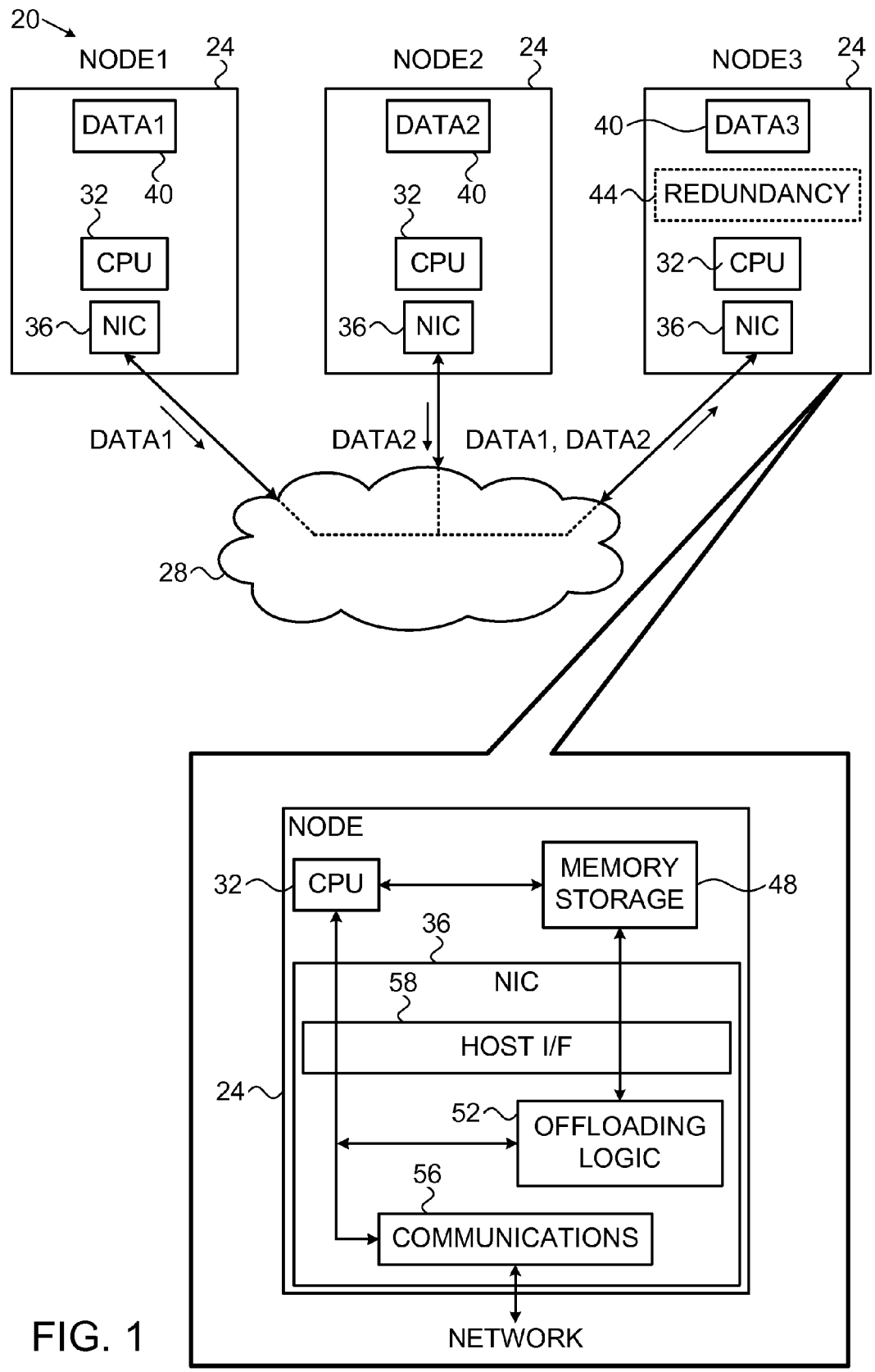
FIG. 1 is a block diagram that schematically illustrates a distributed storage array and an associated method for storing data, in accordance with an embodiment of the present invention.

Redundant storage systems typically comprise multiple nodes (also referred to as compute nodes, network nodes or storage nodes), which communicate over a communication network and collectively store distributed data and redundancy information. Stored data is often arranged in stripes, wherein each stripe comprises multiple data blocks and one or more redundancy blocks that are distributed among the nodes. The redundancy information may be used to recover lost data in a failing node. Calculations involved in deriving redundancy information from data blocks (build, or encode) as well as using remaining redundancy information and/or data blocks to recover lost data/redundancy (rebuild or decode) may consume extensive computation resources, such as complex dedicated hardware and/or software modules.

Embodiments of the present invention that are described herein provide improved methods and systems for distributed data storage. In the disclosed embodiments, each node comprises a storage device, a central processing unit (CPU) and a network interface controller (NIC). The NIC performs a dual function—it communicates with other nodes over the network, and also comprises computation logic and possibly a cache memory that are used to offload the node CPU from calculations and traffic management related to data storage and recovery.

In some embodiments, when preparing to store a new data stripe, all the data blocks of the data stripe are locally present in a node, or possibly sent to the node from other nodes. To offload the CPU, the node uses the NIC computation logic to derive redundancy information. The redundancy information may be stored locally or sent to another node (or nodes) for storage. The NIC offloads the CPU by performing the required intensive calculations, as well as offloading the CPU from handling redundant data transfers over the network and/or to local storage via an internal interface.

In other embodiments, a node is required to recover a lost data or redundancy block that belongs to some data stripe. The node accepts the remaining data and/or redundancy blocks of that data stripe stored in other nodes, and uses the remaining blocks to restore the lost data block. The node performs restoring calculations using the NIC computation logic to offload the node CPU.

In yet other embodiments, following a node updating a data block, re-calculation of the respective redundancy information is required. Updating information is sent from the updating node to a node that re-calculates updated redundancy via its NIC logic, to offload the CPU. The updated redundancy may be stored at the calculating node or sent for storage in another node. In an embodiment, the updating information comprises partial encoding calculations performed by the local NIC.

In other embodiments, redundancy information is calculated in a progressive and distributed manner. Some nodes use their local NIC computation logic to calculate partial redundancy results, and send these results to other nodes that possibly continue partial encoding based on received partial results and locally stored data. The partial results arrive at a node that combines the partial redundancy results to produce the redundancy information using its NIC computation logic.

In summary, the disclosed techniques use computation logic in NICs to offload the node CPUs from performing redundancy information calculations. Moreover, the disclosed NICs also offload the CPUs from handling redundant data transfers. In some example embodiments, data is efficiently passed to/from the computation logic or cache only once. A CPU may initiate the NIC by a single command, to efficiently perform all the calculations and data transfers without further intervention. In distributed storage systems, redundancy information calculations are closely related to communication functions. Therefore, embedding this functionality in the NIC is highly efficient in terms of hardware complexity and communication overhead inside the node. Moreover, the disclosed techniques obviate the need for a RAID controller. This distributed architecture is highly flexible, scalable and fault tolerant.

System Description

Data reliability is a major requirement in distributed and redundant storage systems. If a storage node fails, the system is required to rapidly recover all the lost data. In some embodiments, the usage of redundancy information enables recovery of lost, damaged or otherwise unavailable data. For the sake of description clarity, the methods described herein deal with data storage and recovery of a single data stripe. The methods however, are readily applicable to any suitable amount of data.

For each data stripe, redundancy information is stored in addition to the data blocks. Methods for redundancy information calculations include for example, repetition codes, parity check codes, and Reed Solomon (RS) codes. The parity check code of set of data blocks is calculated by a bitwise Exclusive Or (XOR) of all the data blocks. If for example D1, D2, and D3 denote three data blocks, then the respective redundancy information R is calculated by R=D1+D2+D3, wherein + denotes bitwise XOR.

As another example, in case two redundancy blocks, i.e., R1 and R2, are derived from four data blocks {D1, D2, D3, D4} using RS encoding, the operation may be formulated by [R1, R2]=EncRS (D1, D2, D3, D4), wherein EncRS denotes a RS encoding operation. Using N redundancy blocks enables to recover any combination of lost N data/redundancy blocks, if all other blocks are available.

Data/redundancy blocks that aid in recovering lost blocks are referred to as surviving blocks. If for example, D3 is lost, it may be recovered by calculating D3=DecRS (D1, D2, R), D1, D2 and R being surviving blocks, and DecRS denotes a RS decoding operation. The storage operations of redundancy calculation and data recovery are also referred to as encoding and decoding operations respectively. The methods described herein make exemplary use of the RS code for calculating redundancy information, however, any other suitable codes such as repetition or parity check codes may be additionally or alternatively used.

In addition to recovering lost/damaged blocks, the disclosed techniques may be used to duplicate or mirror data that is temporarily unavailable. For example, a node that stores a data block of a stripe may be temporarily overloaded and may therefore fail to access a stored data block. The unavailable block may be recovered using surviving blocks and stored in another node allocated for that purpose by system 20.

FIG. 1 is a block diagram that schematically illustrates a distributed data storage system 20 that performs distributed storage, in accordance with an embodiment of the present invention. In FIG. 1, system 20 comprises three storage nodes 24 denoted NODE1, NODE2, and NODE3. The nodes communicate with each other using a communication network 28.

System 20 may use any suitable type of communication network and related protocols. For example, the network may comprise a local or a wide area network (WAN/LAN), a wireless network or a combination of such networks, based for example on the geographic locations of the nodes. Additionally, the network may be a packet network such as IP, Infiniband or Ethernet network delivering information at any suitable data rate.

System 20 may carry out any suitable tasks or applications. In some embodiments, such as in a data center application, the main function of system 20 is to store data.

In other embodiments, however, system 20 may perform various other computation tasks, e.g., High-Performance Computing (HPC), which involves data storage. As such, the term "nodes" refers to any suitable computing/storage platform having data storage capabilities.

In the example of FIG. 1, each node comprises a CPU and a network interface controller (NIC) 36 that connects to network 28. Each node further comprises a storage device (48 in the detailed node diagram at the bottom of the figure) that may store data blocks 40, redundancy information 44, and other information as required by the CPU. In the example of FIG. 1, nodes 24 store respective data blocks 40 denoted DATA1, DATA2, and DATA3, all belong to a common data stripe (not shown). NODE3 further stores redundancy information 44 derived from DATA1, DATA2, and DATA3. REDUNDANCY 44 may be used to recover any of the data blocks DATA1, DATA2, or DATA3. Examples for redundancy calculation methods include erasure codes such as repetition codes, parity check codes, and Reed Solomon (RS) codes.

In the example of FIG. 1, three data blocks and one redundancy block are stored. In alternative embodiments, however, any other suitable number of data and redundancy blocks may be used. For example, in an embodiment, two redundancy blocks may be derived from four data blocks. In other embodiments, four redundancy blocks may be derived from ten data blocks.

FIG. 1 further depicts a detailed diagram of NODE3 as a representative node example. The other nodes typically have a similar structure. As described above, the node comprises CPU 32, NIC 36 and memory storage device 48. NIC 36 comprises offloading computation logic 52, a communication interface 56, and a host interface 58. Interface 58 enables data transfer between the NIC and both the CPU and the storage device. Interface 56 and offloading computation logic 52 are referred to herein as circuitry that carries out the various communication and redundancy computation tasks of the NIC. In some embodiments, offloading logic 52 further comprises a cache memory.

CPU 32 typically carries out management activities of the node. Moreover, in case the node additionally serves as a computing node or a server, the CPU may run one or more programs or applications as required. Offloading logic 52 is configured to perform storage-related calculations such as redundancy information calculation and lost data recovery. The offloading logic can accept input information from the network, from the CPU or directly from storage 48 via interface 58. Data accepted at the offloading logic may be locally cached to save redundant access operations to memory storage 48. Outputs derived by the offloading logic may be locally stored in storage 48 or sent to other nodes for storage via communication interface 56. In some embodiments, the CPU may still perform some redundancy information and data recovery calculations.

The configuration of storage node 24 in FIG. 1 is an example configuration, which is chosen purely for the sake of conceptual clarity. In alternative embodiments, any other suitable configuration can also be used. For example, the system may comprise any other suitable number of nodes. The different elements of node 24, such as for example the elements of NIC 36, may be implemented using any suitable hardware, such as in an Application-Specific Integrated Circuit (ASIC) or Field-Programmable Gate Array (FPGA). In some embodiments, some elements of node 24 and NIC 36 can be implemented using software, or using a combination of hardware and software elements. Memory storage device 48 may comprise any suitable storage media, such as magnetic media or solid-state memory.

Typically, CPU 32 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Storage Operations while Offloading the CPU

In the description that follows, multiple described embodiments utilize the NIC offloading logic 52 to perform storage-related operations, thus freeing the node CPU 32 from that burden. Additionally, the NIC frees the CPU from redundant data transfers. Table 1 summarizes the example storage operations that are described below.

TABLE 1

Example storage operations

| Storage operation | NODE1 | NODE2 | NODE3 |
|---|---|---|---|
| 1 Encode | DATA1 → NODE3 | DATA2 → NODE3 | REDUNDANCY = EncRS (DATA1, DATA2, DATA3) |
| 2 Decode anywhere | DATA1 → NODE3 | DATA2 → NODE3 | RECOVERED DATA3 = DecRS (DATA1, DATA2, REDUNDANCY) |
| 3 Update | EncRS(DATA1 + DATA1') → NODE3 | Do nothing | REDUNDANCY' = REDUNDANCY + EncRS(DATA1 + DATA1') |
| 4 Progressive encode | NODE1-2, NODE4-5 E1 = EncRS (D1) E2 = EncRS (D2) → NODE3 E4 = EncRS (D4) E5 = EncRS (D5) → NODE6 | NODE5, NODE6 E3 = E1 + E2 + EncRS (D3) → NODE7 E6 = E4 + E5 + EncRS (D6) → NODE7 | NODE7 REDUNDANCY = E3 + E6 + EncRs (D7) |

Figure 4:
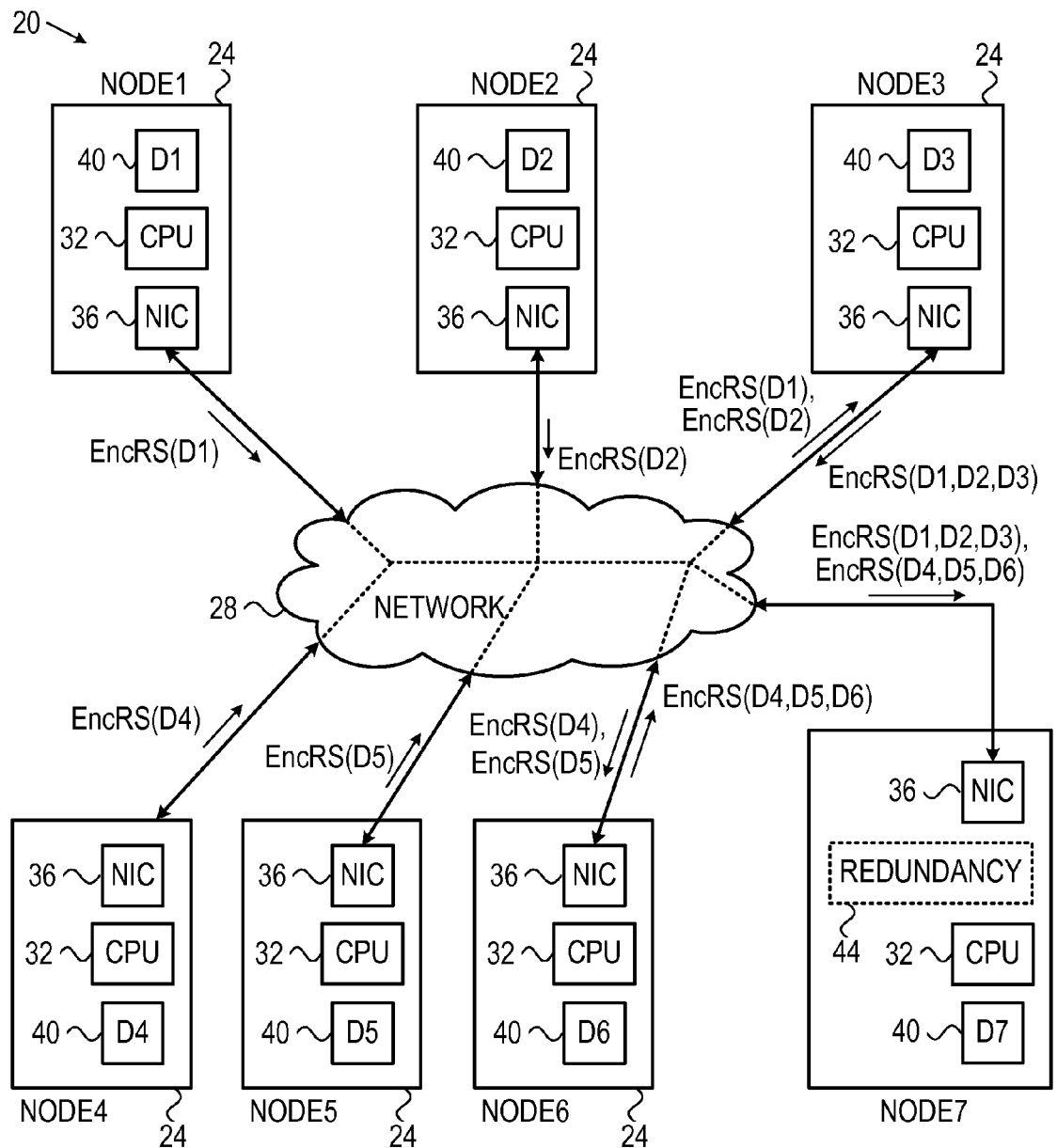
FIG. 4 is a block diagram that schematically illustrates a distributed storage array and an associated method for distributed data storage, in accordance with an embodiment of the present invention.

In Table 1, each row relates to one type of storage operation/calculation. In the table, DATA1, DATA2 and DATA3 are data blocks stored in respective nodes NODE1, NODE2 and NODE3. D1, . . . , D7 in the fourth row denote data blocks stored in NODE1, . . . , NODE7 respectively as depicted in FIG. 4 below. An arrow denotes sending operation. For example, DATA1→NODE3 denotes NODE1 sending DATA1 to NODE3. Each row details the operation done by each node. For example, the operation EncRS (DATA1+ DATA1')→NODE3 performed by NODE1 in the third row, means that NODE1 calculates the bitwise XOR between DATA1 and DATA1', calculates RS encoding, and sends the result to NODE3. In the description that follows, DATA1, DATA2, DATA3 and REDUNDANCY 44 comprise a data stripe, in which REDUNDANCY 44 is the respective redundancy information computed over the three data blocks. In FIG. 4 below, REDUNDANCY 44 is computed over data blocks D1, . . . , D7.

Encode

We now refer back to FIG. 1 and to the first row in Table 1, to describe a method for distributed storage wherein one node calculates (and possibly stores) redundancy information. The method can operate in two modes. In one mode all the data is already located at the node and in the other mode some or all of the data is sent to the node prior to calculating the redundancy. Assume first that NODE1, NODE2, and NODE3 initially store data blocks DATA1, DATA2, and DATA3 respectively. Prior to redundancy calculation, NODE1 and NODE2 send respective blocks, DATA1 and DATA2 to NODE3. NODE3 accepts the data blocks via communication interface 56 and stores the blocks in memory storage 48 or directly in the cache memory in offloading logic 52. When all the blocks are available in the cache (or read into the cache from memory storage 48) offloading logic 52 calculates RS redundancy over the data and stores the result in the NIC cache or in the memory storage. Additionally or alternatively, NODE3 may send the redundancy for storage in another node.

In an alternative embodiment, the NIC calculates the redundancy information on the fly as data blocks are received, instead of waiting for all the data blocks to arrive. For example, in case DATA2 arrives before DATA1, the NIC first calculates a temporary result RTEMP=EncRS (DATA3, DATA2). When DATA1 later arrives, the NIC completes the calculation by calculating REDUNDANCY=EncRS (DATA1)+RTEMP. Further alternatively, in a system comprising multiple nodes, the destination node may store some blocks sent by other nodes in the storage memory or in the cache memory and progressively calculate redundancy information on other blocks immediately upon their arrival. Alternatively to storing REDUNDANCY 44 locally, NODE3 may send the redundancy information for storage at another node. Progressive calculations by the NIC, as data arrives, save redundant transfer of temporary results between the NIC and storage memory 48.

Note that as logic 52 communicates data/redundancy directly with memory storage 48 and/or with other nodes via communications interface 56, the data path between CPU 32 and memory storage 48 is not involved with redundancy calculations. Additionally, data/redundancy is only passed once to/from the offloading logic.

In some embodiments, all the data blocks of a data stripe are already available in memory storage 48 of one node. In the present example assume all data is stored in NODE3, and NODE1, NODE2 are used only for storage. NODE3 is required to calculate redundancy over the data and send data blocks and redundancy for storage in other nodes. Logic 52 of NODE3 accepts data blocks from the local memory storage rather than from other nodes via the network, and stores the data in the cache of logic 52. The NIC calculates RS encoding over the data blocks to offload the CPU from this burden. NODE3 then sends data blocks and/or redundancy result for storage in other nodes. In alternative embodiments, logic 52 calculates the redundancy on the fly as data blocks are sent either from the cache or from the memory storage to be stored in other nodes.

In case logic 52 comprises a cache memory, redundant transfers over interface 58 between memory storage 48 and offloading logic 52 are avoided. For example, logic 52 can communicate data/redundancy directly with the memory storage or with other nodes via interface 56. Moreover, using a cache, data/redundancy is passed only once to/from offloading logic 52. Additionally, when calculating redundancy on the fly and data blocks are received or sent by the NIC, the cache may be used to store redundancy results, and/or data to be sent following sending the redundancy.

In some embodiments, a node may calculate redundancy over the data and send only the redundancy for storage in other nodes, whereas data blocks are not sent. Alternatively, at least some of the redundancy can be stored locally by NIC 36 directly accessing memory storage 48. Further alternatively or additionally some or all the data blocks are also sent for storage in other nodes.

It will be appreciated that the above-described use of cache memory in offloading logic 52 is applicable to other operating modes that are described further below. In particular, caching data accepted from the memory storage or from the network saves redundant transfers between the memory storage and the offloading logic. Moreover, information passes only once to/from offloading logic 52.

Decode Anywhere

Figure 2:
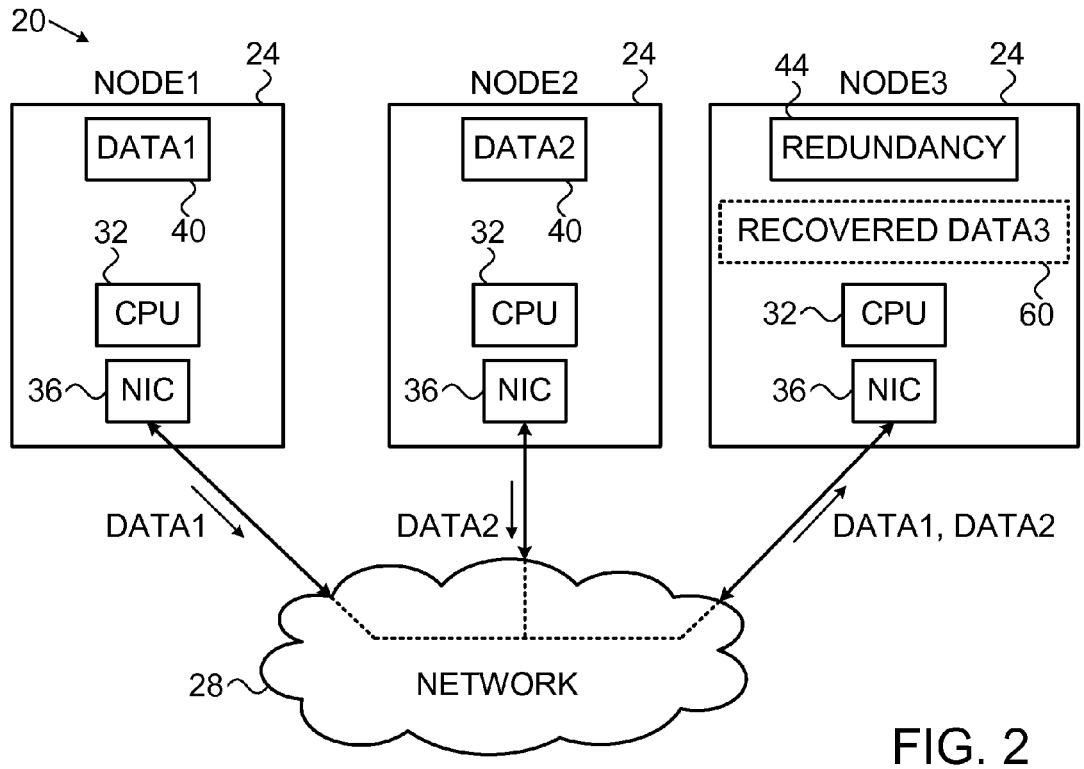
FIG. 2 is a block diagram that schematically illustrates a distributed storage array and an associated method for data recovery, in accordance with an embodiment of the present invention.

In system 20, any node may rebuild a lost data or redundancy block, whether the block is stored locally or else stored in some other node. FIG. 2 is a block diagram that schematically illustrates a method for recovering data in a distributed storage array, in accordance with an embodiment of the present invention. The second row of Table 1 also refers to the present method. In the present example, data block DATA3 in NODE3 is lost or damaged and needs to be recovered.

Assume that surviving blocks DATA1, DATA2 and REDUNDANCY are stored in respective nodes NODE1, NODE2, and NODE3. The method begins by NODE1 and NODE2 sending DATA1 and DATA2 to NODE3. NODE3 accepts the surviving data blocks via communication interface 56 and stores the blocks in memory storage 48, or in the cache of offloading logic 52. NODE3 then rebuilds RECOVERED DATA3 using NIC computation logic 52 by calculating RECOVERED DATA3=DecRS (DATA1, DATA2, REDUNDANCY).

In an alternative embodiment, a node may rebuild a locally lost block in another node. For example, NODE3 may recover DATA1 (lost in NODE1), by sending DATA2 to NODE3 and calculating RECOVERED DATA1=DecRS (DATA2, DATA3, REDUNDANCY).

Additionally or alternatively, in some embodiments redundancy information is sent to another node for data recovery. For example, NODE3 may send both REDUNDANCY and DATA3 to NODE2 to recover lost DATA1, by calculating RECOVERED DATA1=DecRS (DATA2, DATA3, REDUNDANCY).

Further additionally or alternatively, lost REDUNDANCY may be recovered at one of the nodes by calculating RECOVERED REDUNDANCY=DecRs (DATA1, DATA2, DATA3).

Yet further additionally or alternatively, a rebuild operation may be carried out by a node that initially has none of the respective surviving data or redundancy blocks locally stored.

Update a Data Block and Redundancy

When a node changes a stored data block, the respective redundancy information should be updated accordingly. In principle, all the data blocks of the respective data stripe can be sent to a single node to recalculate the updated redundancy. The method described below efficiently updates the redundancy information using updating data originating in the node where the data block has changed.

Figure 3:
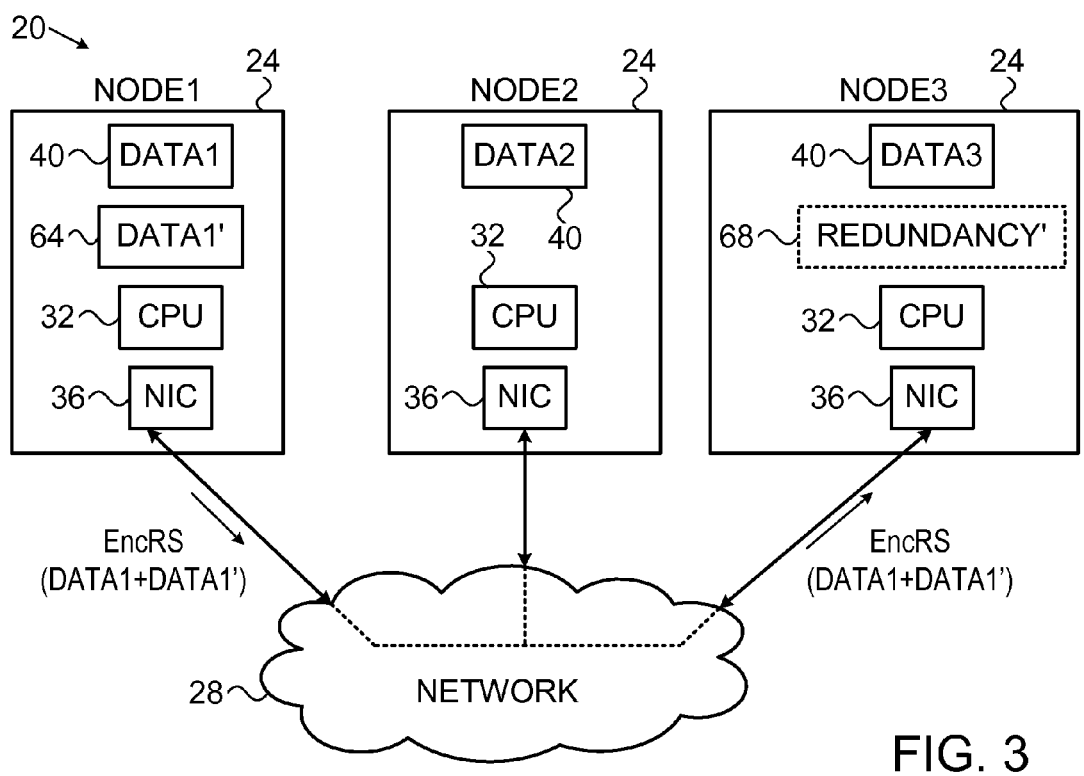
FIG. 3 is a block diagram that schematically illustrates a distributed storage array and an associated method for updating data, in accordance with an embodiment of the present invention.

FIG. 3 is a block diagram that schematically illustrates a method for updating data and respective redundancy information in a distributed storage array, in accordance with an embodiment of the present invention. The third row in Table 1 is related to the present example method. In the present example, DATA1, DATA2, and DATA3 are data blocks stored in the memory storage of respective nodes NODE1, NODE2, and NODE3. Additionally, NODE3 stores respective REDUNDANCY 44 (not shown). The redundancy information could be calculated, for example, by the method of FIG. 1.

The example method begins with NODE1 changes data block DATA1 to DATA1'. NODE1 then calculates updating information as a RS encoding over the bitwise XOR between DATA1 and DATA1', and sends the result to NODE3. The updating information is also referred to as a delta block. NODE3 calculates (using NIC 36) the bitwise XOR between REDUNDANCY 44 and the updating information from NODE1, and produces an updated REDUNDANCY' 68.

In alternative embodiments, the delta block equals DATA1+DATA1' with no RS encoding. In such embodiments NODE3 performs the RS encoding over DATA1+DATA1' before calculating the XOR with REDUNDANCY.

Progressive Redundancy Calculation

In the method of FIG. 1 above, the stripe's redundancy information is calculated at a single node. In the method described below, nodes calculate partial redundancy based on the data block stored locally, and partial redundancy sent from other nodes. The method enables efficient distributed calculation of the redundancy information.

FIG. 4 is a block diagram that schematically illustrates a method for storing data in a distributed storage array, in accordance with an embodiment of the present invention. The method assumes that nodes NODE1, . . . , NODE7 initially store respective data blocks D1, . . . , D7. The example method begins with NODE1 and NODE2 sending respective encoded data blocks E1=EncRS (D1) and E2=EncRS (D2) to NODE3. NODE3 calculates partial redundancy using the accepted encoded blocks and locally stored block D3 to produce E3=EncRS (D1, D2, D3)=E1+E2+EncRS (D3). NODE3 sends the partial redundancy, i.e., EncRS (D1, D2, D3) to NODE7. Similarly, NODE6 accepts encoded blocks E4=EncRS (D4) and E5=EncRS (D5) from respective NODE4 and NODE5, and sends to NODE7 derived partial redundancy E6=EncRS (D4, D5, D6)=E4+E5+EncRs (D6). NODE7 completes the calculation by combining the accepted partial redundancies and the locally stored block DATA7. Thus NODE7 calculates REDUNDANCY=E3+E6+EncRs (D7). NODE1, . . . , NODE7 carry out the encoding and combining calculations using offloading logic 52.

The method of FIG. 4 describes progressive encoding using a tree-like scheme. In alternative embodiments, however, any suitable progressive encoding scheme can be used. For example, System 20 may configure a progressive scheme starting with NODE1 and sequentially using each of the nodes NODE2, . . . , NODE7 to progressively calculate the redundancy information.

In the methods described in FIGS. 1-4, offloading logic 52 is configured to perform storage-related calculations such as redundancy information calculations. In other embodiments however, CPU 32 and offloading logic 52 may share and split redundancy and data recovery calculations. For example, a node whose CPU has available resources may assign some of the storage-related calculations to the CPU, thus improving delays incurred by such calculations.

Although the embodiments described herein mainly address redundant storage schemes such as RAID, the methods and systems described herein can also be used in other applications, such as in general-purpose error correction coding.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Network Interface Controller (NIC) that connects a compute node to a communication network, the NIC comprising:
   a host interface, which is comprised in the NIC and which is configured for communicating with the compute node;
   communication circuitry, which is comprised in the NIC and is configured to communicate with one or more other nodes over the communication network so as to carry out, jointly with one or more other nodes, a redundant storage operation involving data; and
   offloading computation logic circuitry, which is comprised in the NIC and is configured to calculate redundancy information over at least part of the data of the redundant storage operation, while offloading a Central Processing Unit (CPU) of the compute node from calculating the redundancy information.

2. The NIC according to claim 1, wherein the offloading computation logic circuitry is configured to calculate redundancy information over two or more data blocks.

3. The NIC according to claim 1, wherein, by performing the redundancy calculation, the offloading computation logic circuitry is configured to recover a block based on one or more other blocks.

4. The NIC according to claim 1, wherein, following updating of a data block, the offloading computation logic circuitry is configured to calculate an updated version of respective redundancy information depending on a previous version and an updated version of a data block.

5. The NIC according to claim 4, wherein the offloading computation logic circuitry is configured to receive a delta block that is indicative of a difference between the updated and previous versions of the data block, and to calculate the updated version of the redundancy information based on the delta block.

6. The NIC according to claim 1, wherein the offloading computation logic circuitry is configured to calculate partial redundancy information, and to send the partial information to another node for calculation of redundancy information.

7. The NIC according to claim 1, wherein the offloading computation logic circuitry is configured to receive from another node partial redundancy information that was calculated based on one or more data blocks, and to calculate redundancy information based on the partial redundancy information.

8. A method, comprising:
in a Network Interface Controller (NIC) that connects a compute node to a communication network, carrying out, jointly with one or more other nodes, a redundant storage operation involving data, by communicating using the NIC with one or more other nodes over the communication network; and
using offloading computation logic circuitry, which is comprised in the NIC, calculating redundancy information over at least part of the data of the redundant storage operation, while offloading a Central Processing Unit (CPU) of the compute node from calculating the redundancy information.

9. The method according to claim 8, wherein carrying out the redundancy calculation comprises calculating redundancy information over two or more data blocks.

10. The method according to claim 8, wherein carrying out the redundancy calculation comprises recovering a block based on one or more other blocks.

11. The method according to claim 8, wherein, following updating of a data block, calculating an updated version of respective redundancy information depending on a previous version and an updated version of the data block.

12. The method according to claim 11, wherein calculating the updated version comprises receiving a delta block that is indicative of a difference between the updated and previous versions of the data block, and calculating the updated version of the redundancy information based on the delta block.

13. The method according to claim 8, wherein carrying out the redundancy calculation comprises calculating partial redundancy information, and sending the partial information to another node for calculation of redundancy information.

14. The method according to claim 8, wherein carrying out the redundancy calculation comprises receiving from another node partial redundancy information that was calculated based on one or more data blocks, and calculating redundancy information based on the partial redundancy information.

15. A compute node, comprising:
a Central Processing Unit (CPU); and
a Network Interface Controller (NIC), which is configured to connect the compute node to a communication network and to communicate with one or more other nodes over the communication network so as to carry out, jointly with one or more other nodes, a redundant storage operation involving data, wherein the NIC comprises offloading computation logic circuitry that is configured to calculate redundancy information over at least part of the data of the redundant storage operation, while offloading the CPU from calculating the redundancy information.

16. The compute node according to claim 15, wherein the NIC is configured to calculate redundancy information over two or more data blocks.

17. The compute node according to claim 15, wherein, by performing the redundancy calculation, the NIC is configured to recover a block based on one or more other blocks.

18. The compute node according to claim 15, wherein, following updating of a data block, the NIC is configured to calculate an updated version of respective redundancy information depending on a previous version and an updated version of the data block.

19. The compute node according to claim 18, wherein the NIC is configured to receive a delta block that is indicative of a difference between the updated and previous versions of the data block, and to calculate the updated version of the redundancy information based on the delta block.

20. The compute node according to claim 15, wherein the NIC is configured to calculate partial redundancy information, and to send the partial information to another node for calculation of redundancy information.

21. The compute node according to claim 15, wherein the NIC is configured to receive from another node partial redundancy information that was calculated based on one or more data blocks, and to calculate redundancy information based on the partial redundancy information.

* * * * *